United States Patent
Poltorak

(10) Patent No.: US 7,904,453 B2
(45) Date of Patent: *Mar. 8, 2011

(54) APPARATUS AND METHOD FOR ANALYZING PATENT CLAIM VALIDITY

(76) Inventor: Alexander I. Poltorak, Monsey, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/563,718

(22) Filed: Sep. 21, 2009

(65) Prior Publication Data

US 2010/0005094 A1 Jan. 7, 2010

Related U.S. Application Data

(63) Continuation-in-part of application No. 10/760,738, filed on Jan. 20, 2004, now Pat. No. 7,792,832, which is a continuation-in-part of application No. 10/665,237, filed on Sep. 18, 2003, now Pat. No. 7,801,909.

(60) Provisional application No. 60/419,184, filed on Oct. 17, 2002.

(51) Int. Cl.
*G06F 17/30* (2006.01)
*G06F 7/00* (2006.01)

(52) U.S. Cl. ......... 707/730; 707/780; 707/917; 707/931; 707/937; 705/310

(58) Field of Classification Search .................. None
See application file for complete search history.

(56) References Cited

U.S. PATENT DOCUMENTS

| | | | |
|---|---|---|---|
| 5,623,679 A | | 4/1997 | Rivette et al. |
| 5,623,681 A | | 4/1997 | Rivette et al. |
| 5,696,963 A | | 12/1997 | Ahn |
| 5,713,016 A | * | 1/1998 | Hill .................. 707/999.005 |
| 5,721,763 A | | 2/1998 | Joseph et al. |
| 5,754,840 A | | 5/1998 | Rivette et al. |
| 5,799,325 A | | 8/1998 | Rivette et al. |
| 5,806,079 A | | 9/1998 | Rivette et al. |
| 5,809,318 A | * | 9/1998 | Rivette et al. ............. 715/202 |
| 5,845,301 A | | 12/1998 | Rivette et al. |
| 5,848,409 A | | 12/1998 | Ahn |
| 5,982,931 A | | 11/1999 | Ishimaru |
| 5,991,751 A | * | 11/1999 | Rivette et al. ......... 707/999.001 |
| 6,026,388 A | * | 2/2000 | Liddy et al. ............ 707/999.001 |
| 6,038,561 A | * | 3/2000 | Snyder et al. ......... 707/999.002 |

(Continued)

OTHER PUBLICATIONS

Salton, G. and C. Buckley "Term-Weighting Approaches in Automatic Text Retrieval", Information Processing & Management, vol. 24, No. 5, 1988, pp. 513-523.*

(Continued)

*Primary Examiner* — Luke S Wassum
(74) *Attorney, Agent, or Firm* — Anatoly S. Weiser, Esq.; Acuity Law Group

(57) ABSTRACT

A computer system, method, and storage medium with embedded code automate analysis of validity of patent document claims. In embodiments, the computer system receives an identifier of the patent document and a claim, retrieves text of the patent document, parses the text to identify contextually important key terms of the claim, and then formulates one or more queries that include key terms and a priority date relating to the patent document. The system launches the queries and receives search results. From the results, anticipatory candidate members and obviousness candidate members are determined. If the total number of the members is excessive, the queries are reformulated more restrictively, and the search repeated. The system determines contextual relevance of the members and arranges the members in order of their relevance.

36 Claims, 3 Drawing Sheets

U.S. PATENT DOCUMENTS

| | | | |
|---|---|---|---|
| 6,049,811 A * | 4/2000 | Petruzzi et al. | 715/255 |
| 6,289,341 B1 * | 9/2001 | Barney | 707/706 |
| 6,339,767 B1 * | 1/2002 | Rivette et al. | 707/781 |
| 6,401,118 B1 | 6/2002 | Thomas | |
| 6,499,026 B1 * | 12/2002 | Rivette et al. | 707/999.001 |
| 6,560,590 B1 | 5/2003 | Shwe et al. | |
| 6,636,249 B1 | 10/2003 | Rekimoto | |
| 6,662,178 B2 * | 12/2003 | Lee | 707/999.001 |
| 6,665,656 B1 * | 12/2003 | Carter | 707/748 |
| 6,694,331 B2 * | 2/2004 | Lee | 707/706 |
| 6,845,486 B2 | 1/2005 | Yamada et al. | |
| 6,879,990 B1 | 4/2005 | Boyer et al. | |
| 6,996,575 B2 * | 2/2006 | Cox et al. | 707/739 |
| 7,024,408 B2 * | 4/2006 | Dehlinger et al. | 707/739 |
| 7,047,255 B2 | 5/2006 | Imaichi et al. | |
| 7,130,848 B2 * | 10/2006 | Oosta | 707/999.003 |
| 7,139,755 B2 | 11/2006 | Hammond | |
| 7,296,015 B2 * | 11/2007 | Poltorak | 707/707 |
| 7,333,984 B2 * | 2/2008 | Oosta | 707/750 |
| 7,792,832 B2 * | 9/2010 | Poltorak | 707/730 |
| 7,801,909 B2 * | 9/2010 | Poltorak | 707/765 |
| 2001/0027452 A1 * | 10/2001 | Tropper | 707/3 |
| 2002/0042784 A1 * | 4/2002 | Kerven et al. | 706/12 |
| 2002/0062302 A1 * | 5/2002 | Oosta | 707/1 |
| 2002/0077853 A1 * | 6/2002 | Boru et al. | 705/2 |
| 2002/0138297 A1 | 9/2002 | Lee | |
| 2002/0138465 A1 * | 9/2002 | Lee | 707/1 |
| 2002/0138473 A1 * | 9/2002 | Whewell et al. | 707/3 |
| 2002/0138474 A1 * | 9/2002 | Lee | 707/3 |
| 2002/0138475 A1 * | 9/2002 | Lee | 707/3 |
| 2002/0147738 A1 | 10/2002 | Reader | |
| 2003/0033295 A1 * | 2/2003 | Adler et al. | 707/3 |
| 2003/0046307 A1 * | 3/2003 | Rivette et al. | 707/104.1 |
| 2003/0065774 A1 * | 4/2003 | Steiner et al. | 709/225 |
| 2003/0088581 A1 | 5/2003 | Maze et al. | |
| 2003/0187832 A1 | 10/2003 | Reader | |
| 2003/0225749 A1 * | 12/2003 | Cox et al. | 707/3 |
| 2004/0015481 A1 * | 1/2004 | Zinda | 707/1 |
| 2004/0049498 A1 * | 3/2004 | Dehlinger et al. | 707/3 |
| 2004/0078192 A1 * | 4/2004 | Poltorak | 704/9 |
| 2004/0078365 A1 * | 4/2004 | Poltorak | 707/3 |
| 2004/0088332 A1 | 5/2004 | Lee et al. | |
| 2004/0133562 A1 | 7/2004 | Toong et al. | |
| 2004/0158559 A1 * | 8/2004 | Poltorak | 707/3 |
| 2004/0205599 A1 * | 10/2004 | Whewell et al. | 715/515 |
| 2004/0243566 A1 | 12/2004 | Ogram | |
| 2004/0261011 A1 | 12/2004 | Stuckman et al. | |
| 2005/0071367 A1 | 3/2005 | He et al. | |
| 2005/0119995 A1 * | 6/2005 | Lee | 707/3 |
| 2005/0165736 A1 * | 7/2005 | Oosta | 707/2 |
| 2005/0234738 A1 * | 10/2005 | Hodes | 705/1 |
| 2006/0026146 A1 | 2/2006 | Tvito | |
| 2006/0173699 A1 * | 8/2006 | Boozer | 705/1 |
| 2006/0173920 A1 * | 8/2006 | Adler et al. | 707/104.1 |
| 2007/0073625 A1 * | 3/2007 | Shelton | 705/59 |
| 2007/0073653 A1 * | 3/2007 | Raab | 707/3 |
| 2007/0198578 A1 * | 8/2007 | Lundberg et al. | 707/103 R |
| 2007/0208669 A1 * | 9/2007 | Rivette et al. | 705/59 |
| 2008/0154848 A1 * | 6/2008 | Haslam et al. | 707/3 |
| 2008/0183759 A1 * | 7/2008 | Dehlinger | 707/104.1 |
| 2008/0195604 A1 * | 8/2008 | Sears | 707/5 |
| 2009/0006327 A1 * | 1/2009 | Pamp | 707/3 |
| 2010/0005094 A1 * | 1/2010 | Poltorak | 707/5 |

OTHER PUBLICATIONS

Frank, E., G.W. Paynter, I.H. Witten, C. Gutwin and C.G. Nevill-Manning "Domain-Specific Keyphrase Extraction", Proceedings of the Sixteenth International Joint Conference on Artificial Intelligence, Jul. 31-Aug. 6, 1999, pp. 668-673.*

Berger, A., R. Caruana, D. Cohn, D. Freitag and V. Mittal "Bridging the Lexical Chasm: Statistical Approaches to Answer-Finding", Proceeidngs of the 23$^{rd}$ Annual International ACM SIGIR Conference on Research and Development in Information Retrieval, Jul. 24-28, 2000, pp. 192-199.*

Halfbakery "Automation of the Inventive Process", retrieved from www.halfbakery.com/idea/Automation_20of_20the_20Inventive_20Process, Internet post and subsequent comment thread, Sep. 8, 2002.*

Arnold, ClearForest: Cuffing through Content Clutter, downloaded from www.arnoldit.com/articles/clearforest.pdf, 2003, 1-3.

Ballesteros et al., Phrasal Translation and Query Expansion Techniques for Cross-Language Information Retrieval, Proceedings of the 20th Annual International ACM SIGIR Conference on Research and Development in Information Retrieval, 1997, 84-91, vol. 31, Iss. SI, Philadelphia, PA, USA.

Ben-Dov et al., Improving Knowledge Discovery by Combining Text-Mining and Link-Analysis Techniques, undated, downloaded from www.uclic.ucl.ac.uk/paul/research/Moty1.pdf, 2006, 1-7.

Buckman, Data Minin for the Soft Assets, Manning & Napier Investor Relations, 1996, Cross-Border Publishing Ltd., UK, (2 pages).

Calistri-Yeh et al., The MAPIT Patent-TSV System, Advanced Technology Group, Manning & Napier Information Services, Version 2.7, 2000, 1-77.

Clearforest Corp., ClearForest Announces ClearTags 4.0 for Comprehensive Content Auto-Tagging, press release, 2002, (2 pages).

CNET, Welcome to CNET!, downloaded from www.cnet.com, 2001, (3 pages).

Feldman, Manning & Napier Information Services Announces CINDOR a Multi-Language Search-and-Retrieval System, Information Today, 2000, 42, vol. 17, No. 2, doi: https://www.dialogclassic.com/main.vmgw, (2 pages).

Lau et al., Mining the Web for Business Intelligence: Homepage Analysis in the Internet Era, Database Marketing & Customer Strategy Management, 2004, 32-54, vol. 12, No. 1.

Penn Printout, Vendor White Pages, 1994, vol. 11, No. 1, downloaded from www.upenn.edu, (4 pages).

Poltorak et al., Introducing Litigation Risk Analysis, Managing Intellectual Property, 2001, 1-6, Iss. 109.

Poltorak et al., Industrywide Patent Enforcement Strategies, Law Journal Newsletters, Patent Strategy & Management, Oct. & Nov. 2005 (Pts I & II).

PR Newswire, Aurigin and ClearForest Partner to Significantly Increase Search and Analysis Capabilities for Critical Patent Research, press release, 2001, (3 pages).

Robb, Text Mining Tools take on Unstructured Data, Computerworld, 2004, (3 pages).

Ruiz et al., CINDOR Conceptual Interlingua Document Retrieval: TREC-8 Evaluation, NIST Special Publication 500-246, 1999, 597-606.

* cited by examiner

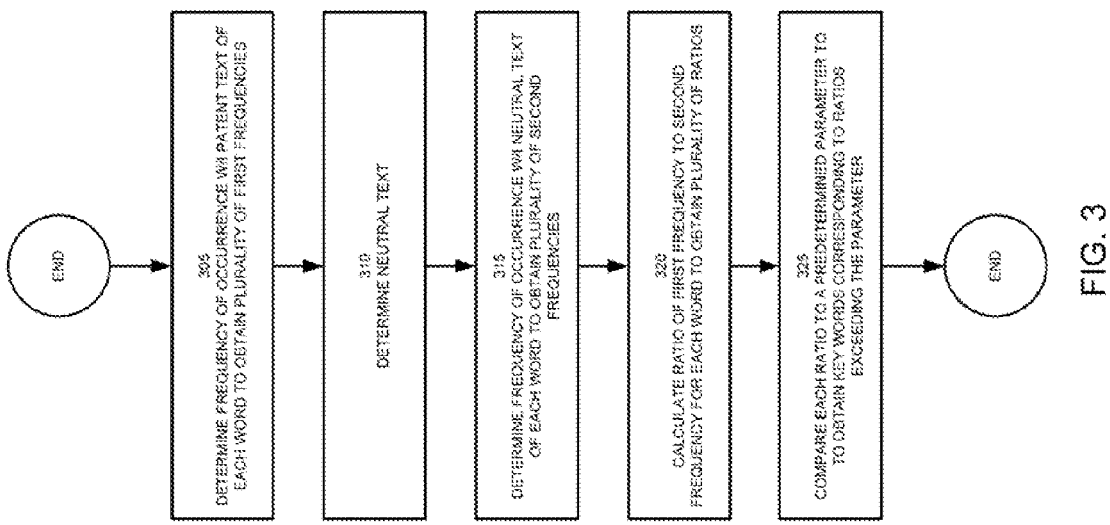

US 7,904,453 B2

APPARATUS AND METHOD FOR ANALYZING PATENT CLAIM VALIDITY

REFERENCE TO RELATED APPLICATIONS

This application is a continuation-in-part and claims priority benefit of U.S. patent application Ser. No. 10/760,738, entitled APPARATUS AND METHOD FOR IDENTIFYING POTENTIAL PATENT INFRINGEMENT, filed 20 Jan. 2004 now U.S. Pat. No. 7,792,832; which was a continuation-in-part and claimed priority of U.S. patent application Ser. No. 10/665,237, filed 18 Sep. 2003 now U.S. Pat. No. 7,801,909, entitled APPARATUS AND METHOD FOR IDENTIFYING AND/OR FOR ANALYZING POTENTIAL PATENT INFRINGEMENT; which claimed priority benefit of provisional U.S. Patent Application Ser. No. 60/419,184, entitled APPARATUS AND METHOD FOR IDENTIFYING AND/OR FOR ANALYZING POTENTIAL PATENT INFRINGEMENT, filed 17 Oct. 2002. Each of the above-referenced patent applications is hereby incorporated by reference in its entirety as if fully set forth herein, including figures, claims, and tables.

FIELD OF THE INVENTION the present invention relates generally to search engines, and, more particularly, to computer-based apparatus and computer-assisted methods for analyzing patent document claim validity.

BACKGROUND

Patents and similar rights of exclusion (collectively referred to as "patents" hereinafter) may need to be enforced to maximize their value, or even to obtain from them any value at all. But before any enforcement steps can be taken, a patent owner may wish to perform additional analysis of validity of the claims of a patent or patents, as the case may be. Further, even before a patent application issues as a patent or is even filed, an owner of the patent application or invention may want to analyze the actual or potential claims of the application for validity. Similarly, other persons and entities may analyze validity of patent and patent application claims, for a variety of reasons, including defending against assertions of patent infringement. The meaning of claim elements may need to be ascertained or guessed, and then the elements and subject matter of the claims as a whole may need to be compared to the universe of products, publications, or whatever else is or was known as of the date of patent filing, invention conception, or possibly some other date such as a date between the dates of conception and filing. This process can involve a great deal of effort and expense on the part of the person or entity interested in the validity of the claims.

A need thus exists for apparatus, methods, and articles of manufacture that can automate the process of analyzing claim validity.

SUMMARY

The present invention is directed to apparatus, methods, and articles of manufacture that may satisfy one or more of these needs.

In an embodiment, a method for analyzing validity of a patent claim is disclosed. The method includes determining frequencies of occurrence, within a text describing the patent claim, of each word of a plurality of words in the patent claim to obtain a plurality of first frequencies. The method also includes determining frequencies of occurrence of said each word in a neutral text to obtain a plurality of second frequencies, wherein the neutral text is unrelated to (i) the patent claim, (ii) the text describing the patent claim, and (iii) the technology of the patent claim and the text describing the patent claim, and wherein the neutral text does not include the patent claim or the text describing the patent claim. The method additionally includes, for said each word, calculating a ratio of the first frequency associated with said each word to the second frequency associated with said each word, thereby obtaining a plurality of ratios, a ratio of the plurality of ratios per said each word. The method further includes comparing each ratio of the plurality of ratios to a first parameter to obtain a plurality of key terms, each key term of the plurality of key terms comprising a word corresponding to a ratio of the plurality of ratios that exceeds the first parameter. The method further includes determining an effective priority date of the patent claim. The method further includes formulating at least one query to search for data items that include the key terms, wherein the at least one query limits time frame of a search in accordance with the at least one query to time preceding the effective priority date of the patent claim. The method further includes launching the at least one query. The method further includes receiving search results responsive to the at least one query. The method further includes determining an anticipatory candidate set by selecting from the search results anticipatory candidate items, wherein each result of the search results that includes all the key terms is selected for the anticipatory candidate set. The method further includes determining an obviousness candidate set by selecting from the search results distinct obviousness combinations, wherein each of the distinct obviousness combinations comprises a different group of no more than a second predetermined number of the search results that includes all the key terms. The method further includes outputting the anticipatory candidate set and the obviousness candidate set.

In an embodiment, a system for analyzing validity of a patent claim is disclosed. The system includes a processor; an input device coupled to the processor, the input device being configured to provide information to the processor; and an output device coupled to the processor. The processor is configured to perform a number of steps. The steps include receiving through the input device data sufficient to obtain a patent claim, text describing the patent claim, and an effective priority date of the patent claim. The steps also include determining frequencies of occurrence, within a text describing the patent claim, of each word of a plurality of words in the patent claim to obtain a plurality of first frequencies. The steps additionally include determining frequencies of occurrence of said each word in a neutral text to obtain a plurality of second frequencies, wherein the neutral text is unrelated to (i) the patent claim, (ii) the text describing the patent claim, and (iii) the technology of the patent claim and the text describing the patent claim, and wherein the neutral text does not include the patent claim or the text describing the patent claim. The steps further include, for said each word, calculating a ratio of the first frequency associated with said each word to the second frequency associated with said each word, thereby obtaining a plurality of ratios, a ratio of the plurality of ratios per said each word. The steps further include comparing each ratio of the plurality of ratios to a first parameter to obtain a plurality of key terms, each key term of the plurality of key terms comprising a word corresponding to a ratio of the plurality of ratios that exceeds the first parameter. The steps further include formulating at least one query to search for data items that include the key terms, wherein the at least one query limits time frame of a search in accordance with the at least one query to time preceding the effective priority date of the patent claim. The steps further include launching the at least one query. The steps further include receiving search results responsive to the at least one query. The steps further include determining an anticipatory candidate set by selecting from the search results anticipatory candidate items, wherein each result of the search results that includes all the key terms is selected for the anticipatory candidate set. The steps further include determining an obviousness candidate set by selecting from the search results distinct obviousness combinations, wherein each of the distinct obviousness combinations comprises a different group of no more than a second predetermined number of the search results that includes all the key terms. The steps further include outputting through the output device the anticipatory candidate set and the obviousness candidate set.

In an embodiment, an article of manufacture is disclosed. The article includes a machine-readable storage medium with instruction code stored in the medium. When the code is executed by a data processing system comprising a processor, the code causes the processor to perform a number of steps to analyze validity of a patent claim. The steps include determining frequencies of occurrence, within a text describing the patent claim, of each word of a plurality of words in the patent claim to obtain a plurality of first frequencies. The steps also include determining frequencies of occurrence of said each word in a neutral text to obtain a plurality of second frequencies, wherein the neutral text is unrelated to (i) the patent claim, (ii) the text describing the patent claim, and (iii) the technology of the patent claim and the text describing the patent claim, and wherein the neutral text does not include the patent claim or the text describing the patent claim. The steps additionally include, for said each word, calculating a ratio of the first frequency associated with said each word to the second frequency associated with said each word, thereby obtaining a plurality of ratios, a ratio of the plurality of ratios per said each word. The steps further include comparing each ratio of the plurality of ratios to a first parameter to obtain a plurality of key terms, each key term of the plurality of key terms comprising a word corresponding to a ratio of the plurality of ratios that exceeds the first parameter. The steps further include determining an effective priority date of the patent claim. The steps further include formulating at least one query to search for data items that include the key terms, wherein the at least one query limits time frame of a search in accordance with the at least one query to time preceding the effective priority date of the patent claim. The steps further include launching the at least one query. The steps further include receiving search results responsive to the at least one query. The steps further include determining an anticipatory candidate set by selecting from the search results anticipatory candidate items, wherein each result of the search results that includes all the key terms is selected for the anticipatory candidate set. The steps further include determining an obviousness candidate set by selecting from the search results distinct obviousness combinations, wherein each of the distinct obviousness combinations comprises a different group of no more than a second predetermined number of the search results that includes all the key terms. The steps further include outputting the anticipatory candidate set and the obviousness candidate set.

These and other features and aspects of the present invention will be better understood with reference to the following description, drawings, and appended claims.

BRIEF DESCRIPTION OF THE FIGURES

FIG. 3 is a high-level flowchart illustrating selected details of a step for identifying key terms of a claim, for use in the process of FIG. 2.

DETAILED DESCRIPTION

Figure 1:
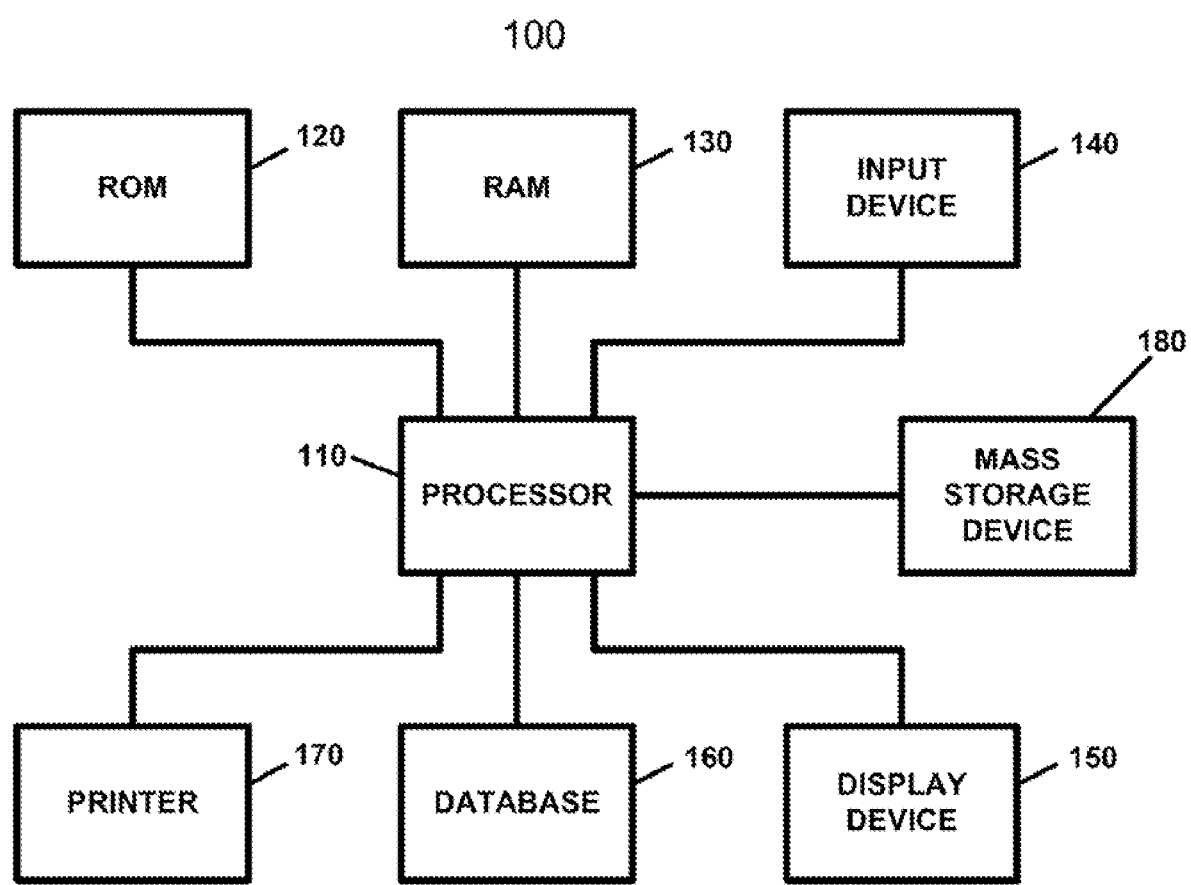
FIG. 1 is a simplified block diagram illustrating selected blocks of a system for performing steps of a process for analyzing validity of patent document claims, in accordance with an embodiment of the present invention.

Reference will now be made in detail to several embodiments and variants of the invention that are illustrated in the accompanying drawings. Wherever possible, same or similar reference numerals are used in the drawings and the description to refer to the same or like parts or steps. The drawings are in simplified form, not to scale, and may omit many apparatus elements and method steps that can be added to the described systems and methods. Some of the steps or elements in the drawings may not necessarily be used in all embodiments and variants.

It should be understood that the inventive concepts described in this document are not necessarily limited to use with issued patents. The concepts may also be applied to potential intellectual property rights of exclusion. Thus, the concepts may be applied to rights that have already ripened and issued into granted patent rights; to provisional, non-provisional, and reexamination applications; and to documents describing ideas that have not yet been filed, such as invention disclosure forms.

Referring more particularly to the drawings, FIG. 1 is a simplified block diagram representation of a computer-based system 100 in accordance with an embodiment of the present invention. The figure does not show many of the system's hardware and software modules, and omits several physical and logical connections. The system 100 can be implemented as a special purpose data processor, a general-purpose computer, a computer system, or a group of networked computers or computer systems configured to perform the steps of the methods in accordance with an embodiment of the present invention, to analyze validity of claim(s) of a patent document. In one embodiment, the system 100 is built on a personal computer platform, such as a Wintel PC or a Mac computer. The personal computer can be a desktop or a notebook computer. In another embodiment, the system 100 is implemented on a computer network within a client/server environment. In various versions of the network-based embodiment, the system 100 is implemented on the Internet, an intranet, an extranet, and/or another network.

The system 100 executes instructions causing it to perform the steps of the methods described in this document, receiving inputs and generating results as described. The instructions may take the form of program code embodied in machine-readable storage media, such as hard drives, flash drives, floppy diskettes, CD-ROMS, DVDs, and other machine-readable storage. The program code can also be transmitted over a transmission medium, for example, over electrical wiring or cabling, through optical fiber, wirelessly, or by any other form of physical transmission. The transmission can take place over a dedicated link between telecommunication devices, or through a wide or local-area network, such as the Internet, an intranet, extranet, or any other type of public or private network.

With reference to FIG. 1, the system 100 includes a processor 110 that can perform some or all of the processing routines and control functions of the methods in accordance with embodiments of the invention. The system 100 also includes memory arrays 120 and 130, and a mass storage device 180. In the illustrated embodiment, the memory array 120 is a read-only memory (ROM) device, the memory array 130 is a random access memory (RAM) device, and the mass storage device 180 is a magnetic disk drive. The mass storage device 180 and each of the memory arrays 120 and 130 are connected to the processor 110 to allow the processor 110 to write into and read from these storage and memory devices.

A user input device 140 is used to enter data or commands into the system 100. The input device 140 can include one or more of the following mechanisms: a keyboard; a scanner; a user pointing device, for example, a mouse, a trackball, or a touch pad.

The system 100 further includes one or more output devices, for example, a display 150 and a printer 170. The output devices provide to the user information, such as uniform resource locator (URL) links to prior art documents potentially relevant to determination of claim validity. As illustrated in FIG. 1, the user input device 140 and the output devices 150 and 170 are coupled to the processor 110. The processor, however, need not be placed proximate to the I/O devices 140, 150, and 170. In one embodiment of the system 100, the I/O devices 140/150/170 are placed in a different physical location than the processor 110, and the connection between these I/O devices and the processor 110 is maintained over a network. The network connection between the I/O devices 140/150/170 and the processor 110 can be a local area network (LAN), a wide area network (WAN), a wired or wireless network, the Internet, an intranet, an extranet, and/or another network The system 100 also includes a database 160 for storing the data that may be needed or desired in performing the method steps described in this document. The database can be a physically separate system coupled to the processor 110 by a dedicated connection or over a network, as illustrated in FIG. 1. In one alternative variant of the system 100, the processor 110 and the mass storage device 180 perform the functions of the database 160.

Figure 2:
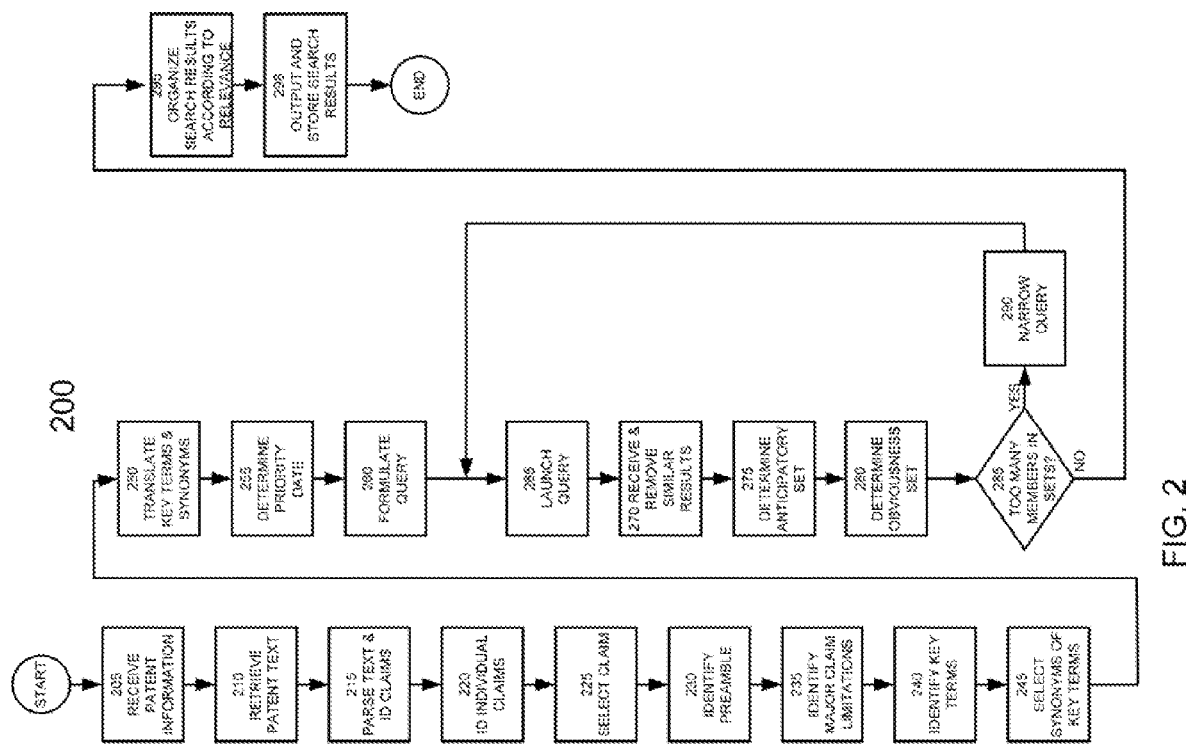
FIG. 2 is a high-level flowchart illustrating selected steps and/or decision blocks of a process for analyzing patent document claim validity, in accordance with an embodiment of the present invention.

FIG. 2 illustrates a flowchart 200 of a process in accordance with an embodiment of the present invention, which process can be performed by the computer system 100. Starting with step 205, the system 100 receives information about the patent document to be analyzed for validity. The information can be the full text of the patent document or the text of the patent's claims, or another identifier of the patent document. In a variant of the process of FIG. 200, however, the information is a patent number, application publication number, or another similar identifier of the patent document. At step 210, the system 100 makes contact with a database containing the analyzed patent document and, using the identifier, retrieves the text of the patent document and, optionally, the patent's drawings. The text in the drawings can be recognized using, for example, optical character recognition (OCR), and then added to the rest of the text of the patent document.

Once the text is retrieved, it is parsed, at step 215, to identify the text of the claims section of the patent document. Given the structure of patent documents, the claims can be identified from their location within the body of the patent. In the U.S. PTO database, for example, the claims follow the entries for title, abstract, bibliographic information, references cited, and cross-reference to related applications. The word "claims" and the expressions such as "I claim," "We claim," and "What is claimed is" can also be used to help in identifying the beginning of the claims section. The end of the claims section can be identified in a similar manner, for example, by the word "description" or other words and expressions that typically follow the claims, such as "background" and "field of the invention." Additionally, claim identification can be reinforced by using the numbering of the claims, and a large number of semicolons among the claims' punctuation marks.

At step 220, each claim from the claims section is identified. This can be achieved, for example, by looking at the claim numbers and the periods at the end of each claim. Each of the claims can be identified as an independent or a dependent claim. Independent claims are distinguished from dependent claims in that they do not contain references to other claims, i.e., they do not include such phrases as "The apparatus of claim N," "An apparatus in accordance with claim N," "The method of claim N," and "The XYZ as in claim N."

At step 225, a particular claim is (or several claims are) selected for validity analysis. For example, the system 100 can receive user input identifying the claim to be analyzed, such as the number of the claim. A claim meeting predetermined criteria may also be selected automatically. For example, the first claim (claim 1 or the only claim) may be selected automatically. As another example, the claim with the fewest or the most words can be selected; in determining the length of a dependent claim, the words of its base and intervening claims may be considered, with or without preambles of the dependent claim itself and of any intervening claims. Continuing with this example, only the preamble of the base claim may be considered for a corresponding dependent claim.

At step 230, the preambles of the selected claims are identified. Preambles stand out—and can be distinguished by—the initial colon of the independent claim and transitional phrases, such as "comprising," "having," "including," "consisting," "which comprises" and "characterized."

At step 235, the system 100 further breaks each claim into major constituent limitations. One way to do this is by using punctuation of the claim, for example, by using the semicolons as separators/delimiters of the major limitations in a claim. Additionally, carriage return characters and paragraph numbering headings, either alone or in conjunction with the punctuation marks, can be used to identify the major claim limitations. If a dependent claim is analyzed, it can be broken down into its major limitations in the same step. Note that for analyzing a dependent claim, the text of its base and any intervening claims is considered to be part of the dependent claim; again, the preambles or portions of preambles of the dependent claim itself and of any of the intervening claims may be omitted here.

At step 240, the system 100 identifies key terms of the preamble and of the major limitations. In doing so, the system 100 can use contextual analysis using the entire patent document text as the context. To identify the key words of the preamble or a limitation, the system first converts the preamble or the limitation, as the case may be, into a string of words. Stop or "chaff" words, i.e., words that provide structure but not substance, are removed. Such words include "a," "an," "is," "this," "being," "rather," "some," "to," "have," "comprising" and similar common words, as well as boilerplate words commonly used in patent claims. Then the system 100 removes inflections from the remaining words. For example, gerunds are converted into verb infinitives. In a process in accordance with an embodiment of the present invention, the remaining words are compared with the text of the entire patent document and to a neutral text, i.e., a large text unrelated to the patent document and to the technology of the patent document. For each word, the frequency of occurrence of the word in the patent document and the frequency of occurrence of the word in the neutral reference text are computed, as well as the ratio of the two frequencies for a corresponding word. The higher the ratio of the frequencies for a word, the more likely it is that the word is related to an element of a potentially invalidating product or document, and should be considered a "key term," that is, be included in a search for prior art. In one embodiment, for example, every word having the ratio of the two frequencies of occurrence higher than a predetermined parameter, such as 1, is considered a key term. A variant of the step 240 is illustrated in FIG. 3 and is discussed in more detail below, in relation to that Figure.

After identifying the key terms, the system 100 determines synonyms of the key terms and words and expressions that are similar to the key terms, at step 245. Hereinafter, I will refer to synonyms and similar words collectively as "synonyms." The synonyms can be determined, for example, by looking up the key terms in a general language dictionary, a thesaurus, or a specialized technical dictionary.

At step 250, the system 100 translates the key terms and their synonyms into one or more additional languages. For example, if the patent text is written in English, the system translates the key terms into languages of non-English-speaking industrialized nations, such as German, French, Japanese, Chinese, and Korean.

At step 255, a priority date is determined. For example, the date may be received from the user of the system; this may be done together with the step 205. As another example, the text of the patent document is parsed to determine the date. In the case of a patent or a published patent application, the date can be derived from parsing the document and identifying its filing date and any priority claims made in the document.

At step 260, the system 100 formulates one or more queries. It should be noted that here equivalent queries in all languages should be considered as a single query. By one or more queries I mean one or more non-equivalent queries. The queries can be formulated simultaneously, or additional queries can be formulated after obtaining results of the searches responsive to previously launched queries. Furthermore, queries can be formulated for several claims of the patent. In one variation of the method of FIG. 2, at least one query is formulated for each claim of the patent. In another variation, at least one query is formulated for each independent claim of the patent. Each of the queries includes a date restriction, so that each of the results existed before (or on, in a variant) the priority date determined in the step 255. Typically, the priority date is some date in the past. In variants, however, the priority date is the current date, which may be useful for searches of patentability of newly-conceived inventions.

One example of a formulated query is a Boolean query requiring the presence of at least one of the key terms or synonyms for the preamble and for each key limitation. Thus, if the preamble has key terms and synonyms $PR_1 \ldots PR_i$, a first key limitation has key terms and synonyms $L1_1 \ldots L1_n$, a second key limitation has key terms and synonyms $L2_1 \ldots L2_m$, and there are no other key limitations, the query might look like this: $[(PR_1 \text{ or } PR_2 \text{ or } \ldots PR_i) \text{ and } (L1_1 \text{ or } L1_2 \text{ or } \ldots L1_n) \text{ and } (L2_1 \text{ or } L2_2 \text{ or } \ldots L2_m)]$.

Many other queries are useful as well. In one exemplary process in accordance with an embodiment of the present invention, weights are assigned to individual key limitations and to the preamble. Then, a query is formulated to bring results having some minimum total weight. In this query scheme, lower weight key limitations may be absent from a search result if higher weight limitations are present in the result. The weight assignments can be contextual, as described above, and based on the context of the full text, abstract, summary, or detailed description of the patent. In a variation of this process, the weights are assigned contextually based on the full text of a sample of patents with the same classification as the analyzed patent document. For example, all patents that issued or were filed during the same year as the analyzed patent document and having the same classification can provide the background (i.e., reference) text for the weight assignments. The weights can be assigned based on the frequencies of occurrence of a given word in the reference text and in a neutral text.

In yet another process in accordance with an embodiment of the present invention, a search query is formulated so that its results will contain at least a predetermined percentage of the key terms, for example, 60, 70, 80, or 90 percent of the key terms. This scheme can be employed when at least a predetermined number of key terms—ten, for example—is present in the chart of the claim. (Claim charts can be generated, as I described in the patent applications identified in the REFERENCE TO RELATED APPLICATIONS section of this document.) In still another process in accordance with an embodiment of the present invention, the formulated query can require that all key terms of the preamble be present in each search result, but that only a predefined percentage of the key terms of the limitations be present in each result.

The one or more queries are launched in step 265. In an embodiment, each query is launched in parallel, using multiple threads and search engines. The foreign language queries are also launched in parallel at the same time. The search engines include several web-based search engines, such as those provided by YAHOO!, Altavista, Web Ferret, and Google. The system 100 further executes searches on commercial databases accessible to it, such as Dialog databases; NERAK databases; Thomas Register databases; Derwent databases; goods and services catalog databases; industry atlas databases; trade, industry, and technical journal databases; product manual compilation databases; and databases of books, magazines, and other publications. For databases that do not require Boolean queries, the queries can be reformulated using, for example, natural language.

In one process in accordance with an embodiment of the present invention, a database storing a compilation of articles published in periodicals from the industry related to the analyzed patent document is implemented as part of the database 160. At least some of the queries are launched against this stand-alone database. In another process in accordance with an embodiment of the present invention, the queries are launched using only external search engines. In yet another process in accordance with an embodiment of the present invention, the queries are launched against both stand-alone databases and using external search engines. One source of particular interest is likely to be a compilation of reviews of new products from publications of the industry to which the analyzed patent document relates.

Chat rooms and bulletin boards are another source of useful information for posting the queries. For this source, the queries are generally formulated in natural language. For example, the system 100 can translate a Boolean query into a natural language query, transmit the query to chat rooms and/or on-line bulletin boards, and then receive and process any responses to the query. The natural language query can take the form of a message such as this one: "Does anyone know of a [product/service/publication] that has these features: (1) . . . , (2) . . . , and one of (3) . . . or (4) . . . ; and that existed before [priority date]?" Natural language question(s) may be automatically formulated and sent to one or more chat rooms and/or bulletin boards. Each such natural language questions may be considered a separate query, or a Boolean query may be automatically translated in a natural language and such translated question may be considered to be part of the same query.

At step 270, the system 100 receives and examines the results of the search(es) and eliminates multiple instances of same or similar results. For example, the results may be received from one or more Internet-based search engines, and multiple instances of the same web page can be identified and reduced to a single result. In an embodiment, all pages within a hierarchy beginning with the same top page are reduced to the same result, for example, the top page or the page with the best match (most key words).

At step 275, the system 100 examines the results received from the step 275 and determines (selects from the results) an anticipatory candidate set of results. Each search result that has all the key terms may be selected for the anticipatory candidate set.

At step 280, the system 100 examines the results received from the step 275 and determines (selects from the results) an obviousness candidate set of combinations such that each of the selected combinations has a distinct group of no more than some predetermined number (e.g., four) of the search results and all of the key terms are found in each of the combinations. No combinations are identical within the obviousness candidate set, and no combination of the set includes all of the results of some other combination of the obviousness candidate set. In an embodiment, no result that belongs to the anticipatory candidate set is used in any of the combinations of the obviousness candidate set.

In decision block 285, the system 100 determines whether there are too many members in the two candidate sets (i.e., whether the sum of the number of members of the obviousness candidate set and the number of the members in the anticipatory candidate set exceeds some predetermined limit). If so, process flow continues to step 290 to narrow the one or more queries. For example, some languages may be omitted from the narrowed query. As another example, a fewer number of queries can be used. As still another example, the predetermined number used in the step 280 (for restricting the number of results in any of the combinations of the obviousness candidate set) is reduced. As a further example, the predetermined percentage of the key terms required in the step 260 of formulating one or more queries is increased, resulting in queries with more key terms. In yet another example, the obviousness candidate set is eliminated from consideration, and, if still needed, the anticipatory candidate set is arbitrarily pruned of a sufficient number of results so that the number of remaining members does not exceed an acceptable predetermined number of members. In an additional example, the limit imposed on the frequency ratios used for determining the key terms (step 240) is decreased to increase the number of key terms. Furthermore, equivalent queries in foreign languages can be eliminated, date restriction can be tightened (moved to an earlier date), certain or all synonyms can be excluded from the disjunctive terms of a Boolean query, and equivalent queries in foreign languages can be eliminated. There are of course other logical ways to narrow the search criteria or otherwise reduce the number of members, including all those described in the parent applications. The specific method for reducing the number of members may be automatically selected, or the system 100 may enable the user to select the method and/or decide on the acceptable number of members.

From the step 290, process flow returns to the step 265, and the steps 265 through 280 are repeated until the test in the decision block 285 indicates that the number of the results is not excessive. Then, the process flow continues to step 295.

In the step 295, the system 100 organizes the search results in order of decreasing contextual relevance. The contextual relevance criteria that can be used for this purpose has been described above, in relation to the steps of determining key terms of the preamble and the limitations, and assigning weights to the key terms. Here, the same reference text can be used to determine relevancy of the search results. Alternatively, a different text can be used to provide the context. In a process in accordance with an embodiment of the present invention, the reference text used is a collection of scientific and engineering articles relating to the technological field of the patent. The articles may be stored in the database 160 of the system 100.

There are many other methods for performing contextual searches and assigning relevancy scores based on context. For examples, an interested reader is referred to U.S. Pat. No. 6,477,524; U.S. Pat. No. 6,546,390; and U.S. Pat. No. 6,189,002. These patents are hereby incorporated by reference.

In embodiments, each member of the anticipatory candidate set is ranked above (and, in the following step, listed/displayed/outputted ahead of) all members of the obviousness candidate set. Within the anticipatory candidate set, each member/result is listed in decreasing order of the total sum of frequency ratios or in decreasing order of total number of occurrences of all the key terms. Consider an example where there are three key terms and the order is according to the sum of frequency ratios. Here, an item with ratios of 5, 7, and 2.1 (sum total of 14.1) would be ranked above (and, in the following step, listed/displayed/outputted ahead of) an item with the corresponding frequency ratios of 4, 5, and 5 (sum total of 14). Next, consider an example where there are three key words and the order is according to the total number of occurrences of all the key words. In this example, an item with 15, 89, and 4 (a total of 108) occurrences of the respective key words would be ranked above (and, in the following step, listed/displayed/outputted ahead of) an item with the corresponding numbers of 9, 85, and 6 (a total of 100) occurrences.

Within the obviousness candidate set, the combinations may be arranged in order of increasing number of search results in a particular combination, so that a member with 4 results would be ranked above (and, in the following step, listed/displayed/outputted ahead of) a member with 5 results. Further, for combinations with the same number of results, the combinations may be arranged in order of decreasing total number of occurrences of all the key terms, or in order of decreasing sums of the frequencies of all the key words. This is similar to the methods described in the preceding paragraph in relation to the ranking of the members of the anticipatory candidate set, but with the summation (of occurrences or frequency ratios) being performed across all the key terms or ratios in each of the search result of a particular member of the obviousness candidate set. Consider an example where a first member and a second member each has two search results and there are a total of three key terms. The first member could be ranked above (and, in the following step, listed/displayed/outputted ahead of) the second member if the first member had a total of N occurrences of all the key words among all three of its search results, while the second member had a total of M (M<N) occurrences of all the key words. Similarly, the second member could be ranked above the first member if the total sum of frequency ratios for the second member were R2 and the total sum of the ratios for the first member were R1 (R1<R2).

In step 298, the ordered results are listed, displayed, outputted, or otherwise presented to the operator of the system 100 or another person, in the order of relevance determined in the step 295. The results can be presented as hypertext links, as addresses of websites, or as indications of where each particular result exists within the body of the database or of another source from which the result originates. The ordered results (and any intermediate results) can also be stored for future reference, or sent to another person or computer over a network, in addition to or instead of being displayed to the operator.

The steps 215-290 can be repeated for other claims of the analyzed patent document, both independent and dependent.

Finally, the results of the search or multiple searches for each claim may be evaluated by a person, to determine whether each of the claims is potentially valid.

FIG. 3 illustrates a flowchart 300 of selected details of a variant of the step 240 of identifying key terms.

At step 305, a determination is made of the frequency of occurrence within the patent document text of each claim word; stop or "chaff" words, and boilerplate words commonly used in patent claims may be ignored, that is, not included among the "claim words." A plurality of first frequencies is thus obtained.

At step 310, the neutral text is determined. For example where the patent document claim and the text are parts of a patent or a patent application classified in one or more classifications, the neutral text can be defined by removing patent documents corresponding to any of the one or more classifications from documents in a patent database. Common stop words that provide structure but not substance, chaff words, and boilerplate words commonly used in patent claims and patent documents may also be removed from the neutral text.

At step 315, a determination is made of the frequency of occurrence within the neutral text of each of the claim words. A plurality of second frequencies is thus obtained.

At step 320, a frequency ratio is calculated for each of the claim words, by dividing the first frequency corresponding to said each claim word by the second frequency corresponding to said each word.

At step 325, each of the calculated ratios is compared to a predetermined parameter, such as a constant. For each ratio exceeding the parameter, the corresponding claim word is considered a key term. It should be noted that the parameter may be made dynamic, so that, for example, at least a minimum number of key terms is obtained for the claim. In a variant, the parameter is decreased in small increments until at least three key terms result.

Although the steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists or the Figures illustrate them, except where explicitly so indicated, otherwise made clear from the context, or inherently required. It should be noted, however, that in selected variants the steps and decisions are performed in accordance with the particular sequences described above and/or shown in the accompanying Figures. Furthermore, not every illustrated step and decision may be required in every embodiment, while some steps and decisions that have not been specifically illustrated may be desirable or necessary in some embodiments.

This document describes the inventive methods, apparatus, and articles of manufacture in considerable detail for illustration purposes only. Neither the specific embodiments and methods of the invention as a whole, nor those of its features necessarily limit the general principles underlying the invention. The specific features described herein may be used in some embodiments, but not in others, without departure from the spirit and scope of the invention as set forth. Furthermore, "couple," "connect," and similar expressions with their variants do not necessarily import an immediate or direct connection, but include connections through intermediate elements within their meaning. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function has been vested in the claims and their equivalents.

I claim:

1. A method for analyzing validity of a patent claim, the method comprising steps of:
   determining frequencies of occurrence, within a text describing the patent claim, of each word of a plurality of words in the patent claim to obtain a plurality of first frequencies;
   determining frequencies of occurrence of said each word in a neutral text to obtain a plurality of second frequencies, wherein the neutral text is unrelated to (i) the patent claim, (ii) the text describing the patent claim, and (iii) the technology of the patent claim and the text describing the patent claim, and wherein the neutral text does not include the patent claim or the text describing the patent claim;
   for said each word, calculating a ratio of the first frequency associated with said each word to the second frequency associated with said each word, thereby obtaining a plurality of ratios, a ratio of the plurality of ratios per said each word;
   comparing each ratio of the plurality of ratios to a first parameter to obtain a plurality of key terms, each key term of the plurality of key terms comprising a word corresponding to a ratio of the plurality of ratios that exceeds the first parameter;
   determining an effective priority date of the patent claim;
   formulating at least one query to search for data items that include the key terms, wherein the at least one query limits time frame of a search in accordance with the at least one query to time preceding the effective priority date of the patent claim;
   launching the at least one query;
   receiving search results responsive to the at least one query;
   determining an anticipatory candidate set by selecting from the search results anticipatory candidate items, wherein each result of the search results that includes all the key terms is selected for the anticipatory candidate set;
   determining an obviousness candidate set by selecting from the search results distinct obviousness combinations, wherein each of the distinct obviousness combinations comprises a different group of no more than a second predetermined number of the search results that includes all the key terms; and
   outputting the anticipatory candidate set and the obviousness candidate set.

2. The method of claim 1, wherein the patent claim and the text are parts of a patent application classified in one or more classifications, the method further comprising a step of defining the neutral text by removing patent documents corresponding to any of the one or more classifications from documents in a patent database.

3. The method of claim 2, further comprising steps of:
determining a number of the anticipatory candidate items in the anticipatory candidate set;
comparing the number of the anticipatory candidate items in the anticipatory candidate set to a limit of quantity of search results; and
if the number of distinct search results exceeds the limit of quantity of search results, narrowing the at least one query and repeating the steps of launching, receiving search results, and determining the anticipatory candidate set.

4. The method of claim 2, further comprising steps of:
determining a combined number of the anticipatory candidate items in the anticipatory candidate set and of the distinct obviousness combinations in the obviousness candidate set;
comparing the combined number of the anticipatory candidate items in the anticipatory candidate set to a limit of quantity of search results; and
if the number of distinct search results exceeds the limit of quantity of search results, narrowing the at least one query and repeating the steps of launching, receiving search results, determining the anticipatory candidate set, and determining an obviousness candidate set.

5. The method of claim 2, further comprising a step of storing the anticipatory candidate set and the obviousness candidate set.

6. The method of claim 2, further comprising steps of:
receiving a patent identifier of a patent comprising the patent claim;
receiving a claim identifier of the patent claim within the patent;
retrieving text of the patent;
parsing the text of the patent to identify claims section of the text of the patent; and
parsing the claims section to identify the patent claim.

7. The method of claim 6, further comprising a step of organizing the search results according to one or more criteria of relevance to the patent.

8. The method of claim 2, further comprising a step of selecting synonyms of the key terms, wherein the step of formulating at least one query comprises the step of formulating a first query to search for data items that include the key terms and the synonyms of the key terms.

9. The method of claim 2, further comprising steps of:
selecting synonyms of the key terms; and
translating the key terms and the synonyms from language of the patent claim into a foreign language, to obtain translated key terms in the foreign language;
wherein the step of formulating at least one query comprises a step of formulating a first query in the language of the patent to search for data items that include the key terms of the one or more limitations of the first independent claim and the synonyms of the key terms, and a step of formulating a second query in the foreign language to search for data items that include the key terms and the synonyms of the key terms in the foreign language, the second query being equivalent to the first query.

10. The method of claim 2, wherein the step of formulating at least one query comprises a step of formulating a plurality of queries.

11. The method of claim 10, further comprising the step of organizing the search results according to one or more criteria of relevance to the patent.

12. The method of claim 10, wherein the step of launching the at least one query comprises a step of parallel launching of the plurality of queries.

13. The method of claim 2, wherein:
the step of defining the neutral text further comprises removing common stop words that provide structure but not substance, and removing boilerplate words commonly used in patent claims.

14. The method of claim 2, wherein:
the step of formulating at least one query comprises automatically generating a natural language question;
the step of launching comprises transmitting the natural language query to a chat room; and
the step of receiving comprises obtaining one or more responses to the natural language question from the chat room, parsing the one or more responses for identifiers of documents, and acquiring the documents through an online resource.

15. The method of claim 2, further comprising the step of organizing the search results according to one or more criteria of relevance to the patent, wherein the criteria is such that
every anticipatory candidate item of the anticipatory candidate set is ahead of all obviousness combinations of the obviousness candidate set;
the anticipatory candidate items are arranged in order of decreasing total number of key terms within each anticipatory candidate item; and
the obviousness combinations are arranged (i) in order of increasing number of search results within each obviousness combination, and (ii) for obviousness combinations having the same number of search results, in order of decreasing total number of key terms within each obviousness combination.

16. A system for analyzing validity of a patent claim, the system comprising:
a processor;
an input device coupled to the processor, the input device being configured to provide information to the processor; and
an output device coupled to the processor;
wherein the processor is configured to perform steps comprising:
receiving through the input device data sufficient to obtain a patent claim, text describing the patent claim, and an effective priority date of the patent claim,
determining frequencies of occurrence, within a text describing the patent claim, of each word of a plurality of words in the patent claim to obtain a plurality of first frequencies,
determining frequencies of occurrence of said each word in a neutral text to obtain a plurality of second frequencies, wherein the neutral text is unrelated to (i) the patent claim, (ii) the text describing the patent claim, and (iii) the technology of the patent claim and the text describing the patent claim, and wherein the neutral text does not include the patent claim or the text describing the patent claim,
for said each word, calculating a ratio of the first frequency associated with said each word to the second frequency associated with said each word, thereby obtaining a plurality of ratios, a ratio of the plurality of ratios per said each word,
comparing each ratio of the plurality of ratios to a first parameter to obtain a plurality of key terms, each key term of the plurality of key terms comprising a word corresponding to a ratio of the plurality of ratios that exceeds the first parameter,
formulating at least one query to search for data items that include the key terms, wherein the at least one query limits the frame of a search in accordance with the at least one query to time preceding the effective priority date of the patent claim, launching the at least one query, receiving search results responsive to the at least one query;

determining an anticipatory candidate set by selecting from the search results anticipatory candidate items, wherein each result of the search results that includes all the key terms is selected for the anticipatory candidate set, determining an obviousness candidate set by selecting from the search results distinct obviousness combinations, wherein each of the distinct obviousness combinations comprises a different group of no more than a second predetermined number of the search results that includes all the key terms, and outputting through the output device the anticipatory candidate set and the obviousness candidate set.

17. The system of claim 16, wherein the patent claim and the text are parts of a patent application classified in one or more classifications, and the steps further comprise defining the neutral text by removing patent documents corresponding to any of the one or more classifications from documents in a patent database.

18. The system of claim 17, wherein the steps further comprise:
determining a number of the anticipatory candidate items in the anticipatory candidate set;
comparing the number of the anticipatory candidate items in the anticipatory candidate set to a limit of quantity of search results; and
if the number of distinct search results exceeds the limit of quantity of search results, repeating the steps of launching, receiving search results, and determining the anticipatory candidate set.

19. The system of claim 17, wherein the steps further comprise:
determining a combined number of the anticipatory candidate items in the anticipatory candidate set and of the distinct obviousness combinations in the obviousness candidate set;
comparing the combined number of the anticipatory candidate items in the anticipatory candidate set to a limit of quantity of search results; and
if the number of distinct search results exceeds the limit of quantity of search results, repeating the steps of launching, receiving search results, determining the anticipatory candidate set, and determining an obviousness candidate set.

20. The system of claim 17, wherein the steps further comprise storing the anticipatory candidate set and the obviousness candidate set.

21. The system of claim 17, wherein the steps further comprise:
receiving a patent identifier of a patent comprising the patent claim;
receiving a claim identifier of the patent claim within the patent;
retrieving text of the patent;
parsing the text of the patent to identify claims section of the text of the patent; and
parsing the claims section to identify the patent claim.

22. The system of claim 21, wherein the steps further comprise organizing the search results according to a criterion of relevance to the patent.

23. The system of claim 17, wherein the steps further comprise selecting synonyms of the key terms, wherein the step of formulating at least one query comprises the step of formulating a first query to search for data items that include the key terms and the synonyms of the key terms.

24. The system of claim 17, wherein:
the steps further comprise:
selecting synonyms of the key terms, and
translating the key terms and the synonyms from language of the patent claim into a foreign language, to obtain translated key terms in the foreign language; and
the step of formulating at least one query comprises a step of formulating a first query in the language of the patent to search for data items that include the key terms of the one or more limitations of the first independent claim and the synonyms of the key terms, and a step of formulating a second query in the foreign language to search for data items that include the key terms and the synonyms of the key terms in the foreign language, the second query being equivalent to the first query.

25. The system of claim 17, wherein the step of formulating at least one query comprises a step of formulating a plurality of queries.

26. The system of claim 25, wherein the steps further comprise organizing the search results according to a criterion of relevance to the patent.

27. The system of claim 25, wherein the step of launching the at least one query comprises a step of parallel launching of the plurality of queries.

28. The system of claim 17, wherein:
the step of defining the neutral text further comprises removing common stop words that provide structure but not substance, and removing boilerplate words commonly used in patent claims.

29. The system of claim 17, wherein the output device is a display.

30. The system of claim 17, wherein:
the step of formulating at least one query comprises automatically generating a natural language question;
the step of launching comprises transmitting the natural language query to a chat room; and
the step of receiving comprises obtaining one or more responses to the natural language question from the chat room, parsing the one or more responses for identifiers of documents, and acquiring the documents through an online resource.

31. The system of claim 17, wherein
the steps further comprise organizing the search results according to one or more criteria of relevance to the patent, wherein the criteria is such that
every anticipatory candidate item of the anticipatory candidate set is ahead of all obviousness combinations of the obviousness candidate set;
the anticipatory candidate items are arranged in order of decreasing total number of key terms within each anticipatory candidate item; and
the obviousness combinations are arranged (i) in order of increasing number of search results within each obviousness combination, and (ii) for obviousness combinations having the same number of search results, in order of decreasing total number of key terms within each obviousness combination.

32. An article of manufacture comprising a machine-readable storage medium with instruction code stored in the medium, said instruction code, when executed by a data processing system comprising a processor, causes the processor to perform the following steps to analyze validity of a patent claim:

determining frequencies of occurrence, within a text describing the patent claim, of each word of a plurality of words in the patent claim to obtain a plurality of first frequencies;

determining frequencies of occurrence of said each word in a neutral text to obtain a plurality of second frequencies, wherein the neutral text is unrelated to (i) the patent claim, (ii) the text describing the patent claim, and (iii) the technology of the patent claim and the text describing the patent claim, and wherein the neutral text does not include the patent claim or the text describing the patent claim;

for said each word, calculating a ratio of the first frequency associated with said each word to the second frequency associated with said each word, thereby obtaining a plurality of ratios, a ratio of the plurality of ratios per said each word;

comparing each ratio of the plurality of ratios to a first parameter to obtain a plurality of key terms, each key term of the plurality of key terms comprising a word corresponding to a ratio of the plurality of ratios that exceeds the first parameter;

determining an effective priority date of the patent claim;

formulating at least one query to search for data items that include the key terms, wherein the at least one query limits time frame of a search in accordance with the at least one query to time preceding the effective priority date of the patent claim;

launching the at least one query;

receiving search results responsive to the at least one query;

determining an anticipatory candidate set by selecting from the search results anticipatory candidate items, wherein each result of the search results that includes all the key terms is selected for the anticipatory candidate set;

determining an obviousness candidate set by selecting from the search results distinct obviousness combinations, wherein each of the distinct obviousness combinations comprises a different group of no more than a second predetermined number of the search results that includes all the key terms; and outputting the anticipatory candidate set and the obviousness candidate set.

33. The article of manufacture of claim 32, wherein the patent claim and the text are parts of a patent application classified in one or more classifications, and the steps further comprise defining the neutral text by removing patent documents corresponding to any of the one or more classifications from documents in a patent database.

34. The article of manufacture of claim 33, wherein:
the step of defining the neutral text further comprises removing common stop words that provide structure but not substance, and removing boilerplate words commonly used in patent claims.

35. The article of manufacture of claim 33, wherein:
the step of formulating at least one query comprises automatically generating a natural language question;
the step of launching comprises transmitting the natural language query to a chat room; and
the step of receiving comprises obtaining one or more responses to the natural language question from the chat room, parsing the one or more responses for identifiers of documents, and acquiring the documents through an online resource.

36. The article of manufacture of claim 33, wherein
the steps further comprise organizing the search results according to one or more criteria of relevance to the patent, wherein the criteria is such that
every anticipatory candidate item of the anticipatory candidate set is ahead of all obviousness combinations of the obviousness candidate set;
the anticipatory candidate items are arranged in order of decreasing total number of key terms within each anticipatory candidate item; and
the obviousness combinations are arranged (i) in order of increasing number of search results within each obviousness combination, and (ii) for obviousness combinations having the same number of search results, in order of decreasing total number of key terms within each obviousness combination.

* * * * *

UNITED STATES PATENT AND TRADEMARK OFFICE
CERTIFICATE OF CORRECTION

| | | |
|---|---|---|
| PATENT NO. | : 7,904,453 B2 | |
| APPLICATION NO. | : 12/563718 | |
| DATED | : March 8, 2011 | |
| INVENTOR(S) | : Alexander Poltorak | |

It is certified that error appears in the above-identified patent and that said Letters Patent is hereby corrected as shown below:

Column 15, line 1, cancel "the frame" and replace the cancelled text with --time frame--;

Signed and Sealed this
Ninth Day of August, 2011

David J. Kappos
*Director of the United States Patent and Trademark Office*